United States Patent

Hardtmann

[15] 3,691,167

[45] Sept. 12, 1972

[54] 5,6,7,8-TETRA HYDRO-2(2,3H)-QUINAZOLINONES

[72] Inventor: Goetz E. Hardtmann, Florham Park, N.J.

[73] Assignee: Sandoz-Wander, Inc., Hanover, N.J.

[22] Filed: March 18, 1971

[21] Appl. No.: 125,856

Related U.S. Application Data

[63] Continuation-in-part of Ser. No. 792,891, Dec. 20, 1968, abandoned.

[52] U.S. Cl. .............................. 260/251 A, 424/251
[51] Int. Cl. .......................................... C07d 51/48
[58] Field of Search ................................. 260/251 A

[56] References Cited

UNITED STATES PATENTS 3,305,553    2/1967    Hoefle et al. ........... 260/256.4

Primary Examiner—Alex Mazel
Assistant Examiner—R. V. Rush
Attorney—Gerald D. Sharkin, Thomas O. McGovern, Thomas C. Doyle, Frederick H. Weinfeldt, Robert S. Honor, Walter F. Jewell and Richard E. Vila

[57] ABSTRACT alkyl-4-aryl-5,6,7,8-tetrahydro-2(2,3H)-quinazolinones, e.g. 3-methyl-4-phenyl-5,6,7,8-tetrahydro-2(2,3H)-quinazolinone having pharmacological activity in animals and useful as anti-inflammatory agents. Also disclosed is process for preparation of said 2(2,3H)-quinazolinones involving reaction of a 2-benzoyl-cyclohexanone with a lower alkylurea.

5 Claims, No Drawings

5,6,7,8-TETRAHYDRO-2(2,3H)-QUINAZOLINONES

This application is a continuation-in-part of copending application Ser. No. 792,891, filed Dec. 20, 1968, now abandoned.

The present invention relates to bicyclic compounds and more particularly to compounds which are 3-substituted-4-aryl-5,6,7,8-tetra-hydro-2(2,3H)-quinazolinones, and to the preparation of said compounds. The invention also relates to pharmaceutical methods and compositions utilizing said 5,6,7,8-tetrahydro-2(2,3H)-quinazolinones.

The compounds of the invention may be represented by the structural formula I:

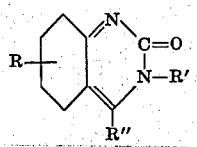
I wherein R' is lower alkyl, preferably one to four carbon atoms, e.g. methyl, isopropyl, etc.;
R is hydrogen or lower alkyl, preferably of from 1 to 3 carbon atoms;
R" is phenyl or substituted phenyl of the formula:

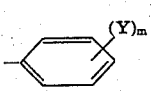

Y is halo of atomic weight of from 19 to 80, lower alkyl, preferably of from one to three carbon atoms, or lower alkoxy, preferably of from one to two carbon atoms; and
m is 0 to 2, and when 2 then Y is the same of different.

The compounds of formula I of the invention are preferably prepared by a Procedure A involving the reaction of a 2-benzoyl-cyclohexanone of formula II:

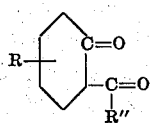
II wherein R and R" are as above-defined, with a lower alkylurea of formula III:

$$\text{HN(R')—CO—NH}_2 \qquad \text{III}$$

wherein R' is as above-defined, at elevated temperatures in the presence of an acid and in an organic solvent medium.

The preparation of compounds I by Procedure A is carried out in the presence of an acid and in an organic solvent at elevated temperatures in the range of 40° to 200° C., preferably 100° to 160° C. The reaction is most suitably carried out in the presence of an acid catalyst and employing an organic acid as the organic solvent medium. The organic solvent is thus most conveniently provided by using an aliphatic carboxylic acid of two to four carbon atoms, e.g., acetic or propionic acid, preferably acetic acid. As the acid catalyst it is generally desirable to employ a strong acid such as a mineral acid, most suitably a hydrogen halide such as hydrogen chloride or hydrogen bromide, preferably hydrogen chloride.

The compounds II and III employed as starting materials in Procedure A are either known or can be prepared from known material by established procedures.

The compounds of structural formula I are useful because they possess pharmacological activity in animals. In particular, the compounds are useful as anti-inflammatory agents as indicated by the Carrageenan-induced edema test on rats (oral administration). For such use, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. The dosage administered will, of course, vary depending upon the compounds used and the mode of administration. However, in general, satisfactory results are obtained when administered at a daily dosage of from about 5 milligrams to about 200 milligrams per kilogram of body weight, preferably given in divided doses 2 to 4 times a day, or in sustained release form. For most mammals the administration of from about 300 milligrams to about 2000 milligrams of the compound per day provides satisfactory results and dosage forms suitable for internal administration comprise from about 75 milligrams to about 1000 milligrams of the compound in admixture with a solid or liquid pharmaceutical carrier or diluent.

The following examples show representative compounds encompassed within the scope of this invention and the manner in which such compounds are prepared. However, it is to be understood that the examples are for purposes of illustration only and are not intended as in any way limiting the scope of the invention.

EXAMPLE 1

3-Methyl-4-phenyl-5,6,7,8-tetrahydro-2(2,3H)-quinazolinone.

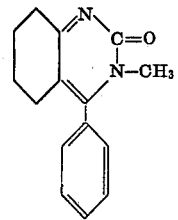

A mixture of 10 g. of 2-benzoyl-cyclohexanone and 3.7 g. of methylurea is refluxed in 50 ml. acetic acid overnight while anhydrous hydrogen chloride is introduced into the mixture. The resulting mixture is cooled, poured on ice, made basic with 50 percent sodium hydroxide solution (cooling). The resulting precipitate is filtered off, washed with water and dried to obtain 3-methyl-4-phenyl-5,6,7,8-tetrahydro-2(2,3H)-quinazolinone, m.p. 154° C.

EXAMPLE 2

3-Isopropyl-4-phenyl-5,6,7,8-tetrahydro-2(2,3H)-quinazolinone.

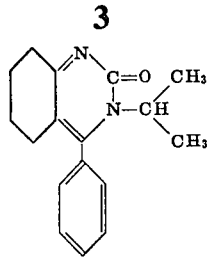

A mixture of 12 g. of 2-benzoylcyclohexanone and 6 g. of isopropylurea in 300 ml. glacial acetic acid is refluxed for 100 hours while anhydrous hydrogen chloride is introduced into the mixture. After cooling the resulting mixture is poured on ice-water (1 kg), made basic with 50 percent sodium hydroxide, and extracted 4 times each with 200 ml. of methylene chloride. The organic phases are combined and washed first with water and then with saturated sodium chloride solution. After drying the organic liquid is evaporated in vacuo the obtain an oil which is treated by addition of diethyl ether to a crystalline material which is dissolved in methylene chloride. The resulting solution is filtered first through carbon and then thru aluminum oxide and the methylene chloride replaced by ethyl acetate from which is crystallized 3-isopropyl-4-phenyl-5,6,7,8-tetrahydro-2(2,3H)-quinazolinone, m.p. 185°–187° C.

The word "lower" as used herein in association with such terms as "lower alkyl," "lower alkoxy," and the like shall be taken as indicating an organic substituent of from one to six carbon atoms, inclusive, unless otherwise defined herein.

At the time of filing the above-identified copending application Ser. No. 792,891 the compounds of the invention were described as 1-substituted-4-phenyl-5,6,7,8-tetrahydro-2(1H)-quinazolinones but subsequent investigation indicated such compounds to have the structure now disclosed herein.

What is claimed is:

1. A compound of the formula:

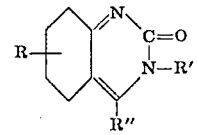

wherein R' is alkyl of one to four carbon atoms;
R is hydrogen or alkyl of one to three carbon atoms;
R'' is phenyl or substituted phenyl of the formula:

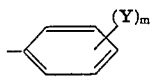

Y is halo of atomic weight of from 19 to 80, alkyl of one to three carbon atoms; or alkoxy of one to two carbon atoms; and
$m$ is 0 to 2, and when 2 then Y is the same or different.

2. A compound of claim 1 in which R is methyl.
3. A compound of claim 1 in which R'' is phenyl.
4. The compound of claim 3 in which R' is isopropyl.
5. The compound of claim 3 in which R' is methyl.

* * * * *